(12) United States Patent
Uematsu et al.

(10) Patent No.: US 10,233,872 B2
(45) Date of Patent: Mar. 19, 2019

(54) FUEL EVAPORATIVE GAS EMISSION SUPPRESSOR

(71) Applicant: MITSUBISHI JIDOSHA KOGYO KABUSHIKI KAISHA, Tokyo (JP)

(72) Inventors: Kyosuke Uematsu, Tokyo (JP); Hideo Matsunaga, Tokyo (JP); Katsuhiro Furuta, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/903,528

(22) Filed: Feb. 23, 2018

(65) Prior Publication Data

US 2018/0274491 A1 Sep. 27, 2018

(30) Foreign Application Priority Data

Mar. 27, 2017 (JP) .................................. 2017-061300

(51) Int. Cl.
*F02M 25/08* (2006.01)
*B01D 53/04* (2006.01)
(Continued)

(52) U.S. Cl.
CPC ..... *F02M 25/0818* (2013.01); *B01D 53/0407* (2013.01); *F02D 19/027* (2013.01); *F02D 41/003* (2013.01); *F02M 21/0293* (2013.01); *F02M 25/08* (2013.01); *F02M 25/089* (2013.01); *F02M 25/0809* (2013.01); *F02M 25/0836* (2013.01); *F02M 25/0854* (2013.01); *F02M 25/0872* (2013.01);
(Continued)

(58) Field of Classification Search
CPC ............... F02M 25/08; F02M 25/0818; F02M 21/0293; F02M 25/0809; F02M 25/0836; F02M 25/0854; F02M 25/0872; F02M 25/089; F02D 19/027; F02D 41/22; F02D 2041/225; F02D 2250/41
See application file for complete search history.

(56) References Cited

U.S. PATENT DOCUMENTS 9,689,349 B2 * 6/2017 Matsunaga .......... F02M 25/089
2014/0174411 A1 6/2014 Matsunaga et al.

FOREIGN PATENT DOCUMENTS

EP 1 643 115 A1 4/2006
JP 2004-300997 A 10/2004

OTHER PUBLICATIONS

Extended European Search Report dated May 14, 2018 in the corresponding European Application No. 18158293.3.

* cited by examiner

*Primary Examiner* — Hieu T Vo
(74) *Attorney, Agent, or Firm* — Birch, Stewart, Kolasch & Birch, LLP

(57) ABSTRACT

After an engine is started, pump monitoring is performed as follows: a canister is opened to the atmosphere; a negative pressure pump is activated; and abnormality of the negative pressure pump is evaluated on the basis of canister pressure Pc detected with a pressure sensor in an evaporative leakage check module, and after the pump monitoring is completed, a switching valve is closed so that the negative pressure pump communicates with the canister for purge any fuel evaporative gas into an intake passage of the engine, and whether or not leakage has occurred in a fuel evaporative gas emission suppressor is evaluated based on the canister pressure Pc.

15 Claims, 5 Drawing Sheets

(51) Int. Cl.
  *F02D 19/02* (2006.01)
  *F02M 21/02* (2006.01)
  *F02D 41/00* (2006.01)
  *F02D 41/22* (2006.01)
(52) U.S. Cl.
  CPC ........ *F02D 41/22* (2013.01); *F02D 2041/225* (2013.01); *F02D 2250/41* (2013.01); *F02M 2025/0881* (2013.01); *F04C 2270/185* (2013.01); *F04C 2270/86* (2013.01)

FUEL EVAPORATIVE GAS EMISSION SUPPRESSOR

BACKGROUND OF THE INVENTION

Field of the Invention

The present invention relates to a fuel evaporative gas emission suppressor, and particularly to a technology for detecting abnormality of a fuel evaporative gas emission suppressor.

Description of the Related Art

To prevent discharge of a fuel evaporative gas evaporated in a fuel tank into the air, a fuel evaporative gas emission suppressor formed of a canister attached to a communication path that allows communication between the fuel tank and an intake passage of an internal combustion engine, a switching valve that opens the interior of the canister to the atmosphere or blocks the interior of the canister from the atmosphere, a sealing valve that allows communication between the fuel tank and the canister or block the communication, and a purge valve that opens and closes a communication path between the intake passage and the canister has been provided. The fuel evaporative gas emission suppressor opens the switching valve and the sealing valve but closes the purge valve when the fuel is fed to allow any fuel evaporative gas in the fuel tank to flow out to the canister so that the fuel evaporative gas is adsorbed by activated carbon disposed in the canister. When the internal combustion engine is activated, the fuel evaporative gas emission suppressor opens the switching valve and the purge valve to discharge the fuel evaporative gas adsorbed by the activated carbon in the canister into the intake passage of the internal combustion engine so that the fuel evaporative gas is processed.

Further, a technology for detecting leakage of the fuel evaporative gas from the fuel evaporative gas emission suppressor and failure of the valves in the suppressor has been developed.

For example, the leakage, the failure of the valves, and other types of abnormality are detected by controlling the switching valve, the sealing valve, and the purge valve when the internal combustion engine is activated to achieve negative pressure in a purge passage and the fuel tank by use of negative pressure produced in the intake passage of the internal combustion engine and evaluating whether or not the negative pressure is maintained.

In a plug-in hybrid car or any other vehicle that includes a motor in addition to an internal combustion engine and travels based primarily on drive force produced by the motor, however, there are few chances of activation of the internal combustion engine for improvement in fuel consumption, and the chance that allows abnormality detection therefore decreases in the case where abnormality of the fuel evaporative gas emission suppressor is detected when the internal combustion engine is activated.

In view of the circumstances described above, there is a fuel evaporative gas emission suppressor provided in a vehicle having few chances of activation of the internal combustion engine, such as that described in Japanese Patent Laid-Open No. 2004-300997. The fuel evaporative gas emission suppressor includes a negative pressure pump capable of lowering the pressure in a passage of the fuel evaporative gas emission suppressor and controls the activation of the negative pressure pump and opening/closing of a switching valve, a sealing valve, and a purge valve during a period for which the internal combustion engine is not in operation to detect abnormality of the fuel evaporative gas emission suppressor on the basis of changes in the sucking pressure of the negative pressure pump and the pressure in the fuel tank.

In the fuel evaporative gas emission suppressor including the negative pressure pump described above, however, detection of abnormality of the negative pressure pump itself is required. The detection of abnormality of the negative pressure pump is also required to be performed quickly as in the case of other types of abnormality detection. For example, at the start of the engine, the detection of abnormality of the negative pressure pump, along with detection of leakage in the fuel evaporative gas emission suppressor, such as leakage in the purge passage and the fuel tank, is desired to be promptly completed.

SUMMARY OF THE INVENTION

In view of the circumstances described above, an object of the present invention is to provide a fuel evaporative gas emission suppressor capable of promptly completing detection of leakage in the fuel evaporative gas emission suppressor and detection of abnormality of a negative pressure generator.

To achieve the object described above, a fuel evaporative gas emission suppressor according to the present invention includes a communication path that allows an intake passage of an internal combustion engine to communicate with a fuel tank, a sealing valve that opens and closes the communication between the fuel tank and the communication path, a canister that is connected to the communication path between the intake passage and the sealing valve so as to branch out from the communication path and adsorbs fuel evaporative gas in the fuel tank, a negative pressure generator that is connected to the canister via a connection path and generates negative pressure in the canister and the fuel tank, a switching valve that performs switching operation of connecting the canister to the negative pressure generator or an atmosphere-side passage that communicates with atmosphere, a bypass passage that causes the negative pressure generator to communicate with the canister via an orifice, a first pressure detector that detects pressure in the connection path, and a control unit that is formed of a storage device and a processing unit; wherein the control unit comprises: a first evaluation controller that activates the negative pressure generator and evaluates abnormality thereof based on the pressure detected by the first pressure detector with the sealing valve open in a state in which the switching valve is controlled so as to connect the canister to the atmosphere-side passage, and a second evaluation controller that operates subsequently to end of the evaluation of abnormality of the negative pressure generator performed by the first evaluation controller, controls the switching valve in such a way that the negative pressure generator is connected to the canister via the connection path so that the gas in the canister and the fuel tank is purged into the intake passage of the internal combustion engine via the communication path, and evaluates whether or not leakage has occurred in the communication path, the canister, and the fuel tank based on the pressure detected by the first pressure detector.

According to the configuration described above, when the first evaluation controller evaluates abnormality of the negative pressure generator, the switching valve and the sealing valve are controlled to open the canister and the fuel tank to the atmosphere, whereby the pressure in the canister and the fuel tank is equal to the atmospheric pressure after the evaluation of abnormality of the negative pressure generator even in a case where the pressure in the fuel tank is high before the start of the evaluation of abnormality of the negative pressure generator. Therefore, even in a case where the second evaluation controller evaluates whether or not leakage has occurred immediately after the evaluation of abnormality of the negative pressure generator, the effect of the pressure in the fuel tank can be avoided, whereby wrong leakage evaluation can be avoided.

Therefore, the evaluation of abnormality of the negative pressure generator and evaluation of whether or not leakage in the canister and the fuel tank has occurred can be successively made after the engine is started, whereby the two types of abnormality evaluation can be promptly completed with accuracy.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be described below with reference to the drawings.

Figure 1:
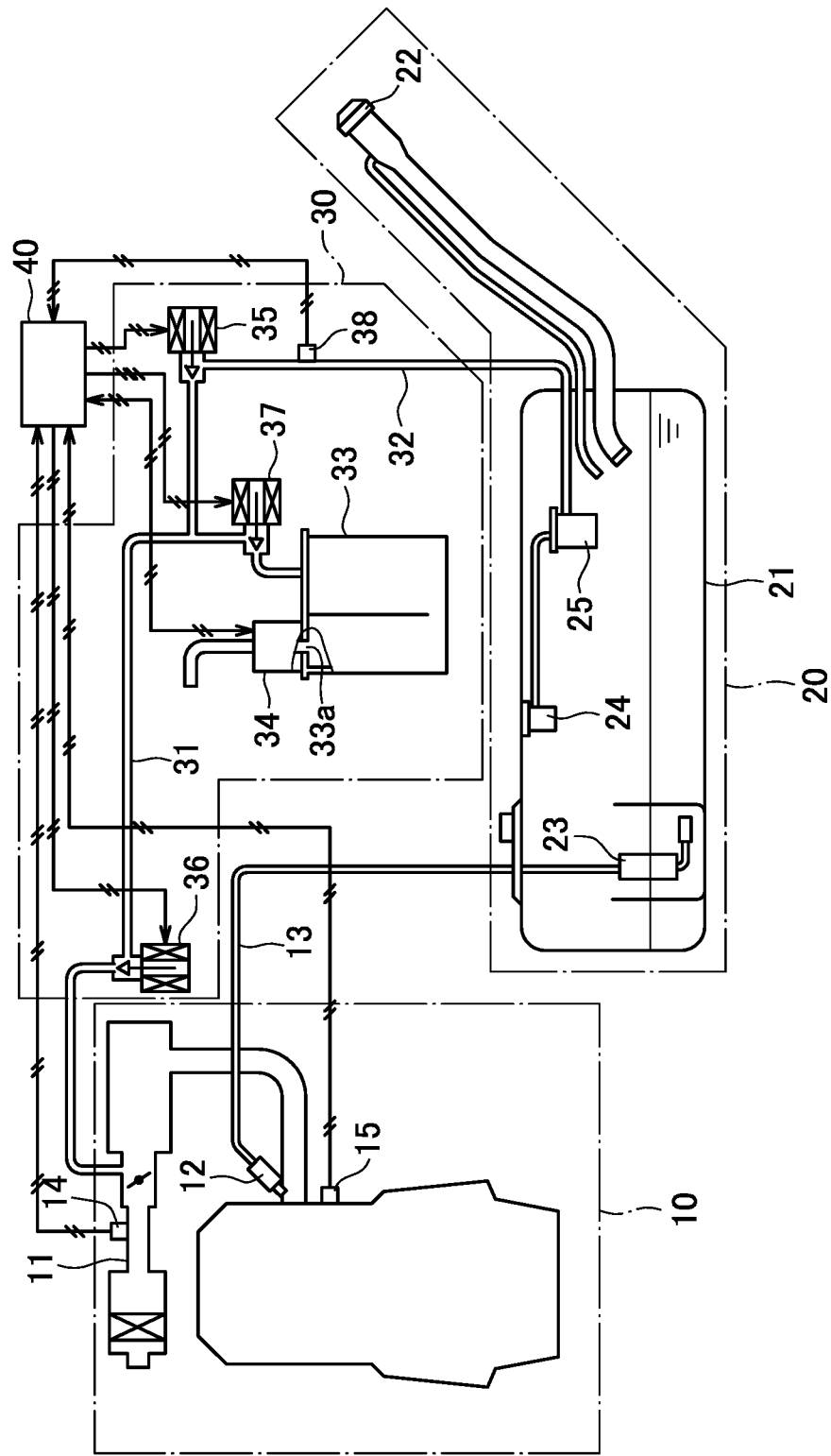
FIG. 1 is a schematic configuration diagram of a fuel evaporative gas emission suppressor according to an embodiment of the present invention.
Figure 2:
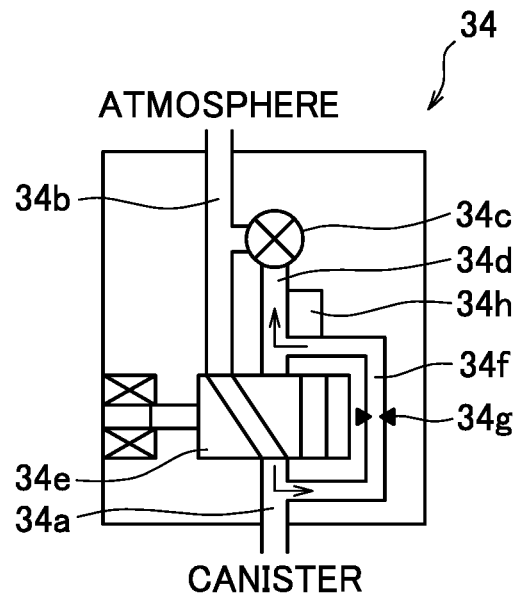
FIG. 2 shows action of an internal constituent part in a case where a switching valve of an evaporative leakage checking module is not in operation.
Figure 3:
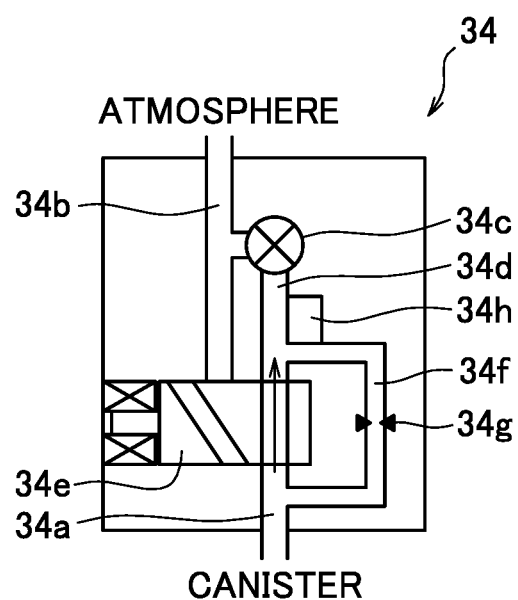
FIG. 3 shows action of the internal constituent part in a case where the switching valve of the evaporative leakage checking module is in operation.

FIG. 1 is a schematic configuration diagram of a fuel evaporative gas emission suppressor 1 according to an embodiment of the present invention. FIG. 2 shows action of an internal constituent part in a case where a switching valve 34e of an evaporative leakage checking module 34 is not in operation. FIG. 3 shows action of the internal constituent part in a case where the switching valve 34e of the evaporative leakage checking module 34 is in operation. The arrows in FIGS. 2 and 3 represent the air flow direction in the case where a negative pressure pump 34c in the evaporative leakage checking module 34 is operated in the states shown in FIGS. 2 and 3. The switching valve 34e is open when it is not in operation in FIG. 2 and is closed when it is in operation in FIG. 3. The configuration of the fuel evaporative gas emission suppressor 1 will be described below.

The fuel evaporative gas emission suppressor 1 according to the present embodiment is used in a hybrid car or a plug-in hybrid car that includes a motor for traveling that is not shown and an engine 10 (internal combustion engine) and uses the motor for traveling and/or the engine 10 to travel.

The fuel evaporative gas emission suppressor 1 includes the engine 10, which is incorporated in the vehicle, a fuel storage 20, which stores fuel, a fuel evaporative gas processor 30, which processes fuel evaporative gas evaporated in the fuel storage 20, and a control unit 40 (first evaluation controller and second evaluation controller), which is a control device for performing overall control of the vehicle, as shown in FIG. 1.

The engine 10 is an intake-passage-injection (multi-point injection: MPI) gasoline engine. The engine 10 is provided with an intake passage 11, through which air is taken into the combustion chamber of the engine 10. A fuel injecting valve 12, through which the fuel is injected into an intake port of the engine 10, is provided, in a downstream position on the intake passage 11. A fuel pipe 13 is connected to the fuel injecting valve 12, and the fuel is supplied from a fuel tank 21, which stores the fuel.

A sucked air temperature sensor 14, which detects the temperature of sucked air, is disposed in the intake passage 11 of the engine 10. A water temperature sensor 15, which detects the temperature of cooling water that cools the engine 10, is disposed in the engine 10.

The fuel storage 20 is formed of the fuel tank 21, a fuel feed port 22, which is a port through which the fuel is injected into the fuel tank 21, a fuel pump 23, which supplies the fuel injecting valve 12 with the fuel from the fuel tank 21 via the fuel pipe 13, a fuel cutoff valve 24, which prevents outflow of the fuel from the fuel tank 21 into the fuel evaporative gas processor 30, and a leveling valve 25, which controls the fuel level in the fuel tank 21 when the fuel is fed. The fuel evaporative gas produced in the fuel tank 21 is discharged through the fuel cutoff valve 24 via the leveling valve 25 to the fuel evaporative gas processor 30.

The fuel evaporative gas processor 30 includes a purge pipe (communication path) 31, a vapor pipe (communication path) 32, a canister 33, the evaporative leakage checking module 34, a sealing valve 35, a purge valve 36, a bypass valve 37, and a pressure sensor 38 (second pressure detector).

The purge pipe 31 is provided so as to cause the intake passage 11 of the engine 10 to communicate with the canister 33.

The vapor pipe 32 is provided so as to cause the leveling valve 25 in the fuel tank 21 to communicate with the purge pipe 31. That is, the vapor pipe 32 is provided so as to cause the fuel tank 21 to communicate with the purge pipe 31.

The canister 33 accommodates activated carbon therein. The purge pipe 31 is connected to the canister 33 so that the fuel evaporative gas produced in the fuel tank 21 or the fuel evaporative gas adsorbed by the activated carbon can flow through the purge pipe 31. The canister 33 is provided with an atmosphere hole 33a, through which outside air is sucked when the fuel evaporative gas adsorbed by the activated carbon is discharged into the intake passage 11 of the engine 10.

The evaporative leakage checking module 34 is provided with a canister-side passage 34a, which leads to the atmosphere hole 33a of the canister 33, and an atmosphere-side passage 34b, which leads to the atmosphere, as shown in FIGS. 2 and 3. A pump passage 34d (connection path), which includes a negative pressure pump (negative pressure generator) 34c, communicates with the atmosphere-side passage 34b. The evaporative leakage checking module 34 is further provided with the switching valve 34e and a bypass passage 34f. The switching valve 34e includes an electromagnetic solenoid and is driven by the electromagnetic solenoid. The switching valve 34e causes the canister-side passage 34a and the atmosphere-side passage 34b to communicate with each other, as shown in FIG. 2, when the electromagnetic solenoid is not energized (OFF) (corresponding to state in which switching valve 34e is open). The switching valve 34e causes the canister-side passage 34a and the pump passage 34d to communicate with each other, as shown in FIG. 3, when a drive signal is externally supplied to the electromagnetic solenoid and the electromagnetic solenoid is therefore energized (ON) (corresponding to state in which switching valve 34e is closed). The bypass passage 34f is a passage that always allows the canister-side passage 34a and the pump passage 34d to be continuous with each other. The bypass passage 34f is provided with a reference orifice 34g having a small diameter (diameter of 0.45 mm, for example). A pressure sensor 34h (first pressure detector), which detects the pressure in the pump passage 34d or the bypass passage 34f downstream of the reference orifice 34g, is provided between the negative pressure pump 34c in the pump passage 34d and the reference orifice 34g in the bypass passage 34f.

The pressure sensor 34h detects canister pressure Pc, which is internal pressure in the canister 33, via the reference orifice 34g.

The sealing valve 35 is attached to the vapor pipe 32 between the fuel tank 21 and the purge pipe 31. The sealing valve 35 includes an electromagnetic solenoid and is driven by the electromagnetic solenoid. The sealing valve 35 is a normally-closed-type electromagnetic valve that is closed when the electromagnetic solenoid is not energized (OFF) and is open when a drive signal is externally supplied to the electromagnetic solenoid and the electromagnetic solenoid is therefore energized (ON). The sealing valve 35, when the electromagnetic solenoid is not energized (OFF) so that the sealing valve 35 is closed, blocks the vapor pipe 32, and the sealing valve 35, when the drive signal is externally supplied to the electromagnetic solenoid to energize the electromagnetic solenoid is (ON) so that the sealing valve 35 is open, opens the vapor pipe 32. That is, the sealing valve 35, when it is closed, seals and blocks the fuel tank 21 so that the fuel evaporative gas produced in the fuel tank 21 is not allowed to flow out into the canister 33 or the intake passage 11 of the engine 10, whereas the sealing valve 35, when it is open, allows the fuel evaporative gas to flow out into the canister 33 or the intake passage 11 of the engine 10.

The purge valve 36 is attached to the purge pipe 31 between the intake passage 11 and a portion where the purge pipe 31 is connected to the vapor pipe 32. The purge valve 36 includes an electromagnetic solenoid and is driven by the electromagnetic solenoid. The purge valve 36 is a normally-closed-type electromagnetic valve that is closed when the electromagnetic solenoid is not energized (OFF) and is open when a drive signal is externally supplied to the electromagnetic solenoid so that the electromagnetic solenoid is energized (ON). The purge valve 36, when the electromagnetic solenoid is not energized (OFF) so that the purge valve 36 is closed, blocks the purge pipe 31, and the purge valve 36, when the drive signal is externally supplied to the electromagnetic solenoid to energize the electromagnetic solenoid is (ON) so that the purge valve 36 is open, opens the purge pipe 31. That is, the purge valve 36, when it is closed, does not allow the fuel evaporative gas to flow from the canister 33 or the fuel tank 21 out into the intake passage 11 of the engine 10, whereas the purge valve 36, when it is open, allows the fuel evaporative gas to flow from the canister 33 or the fuel tank 21 out into the intake passage 11 of the engine 10.

The bypass valve 37 is attached to the purge pipe 31 between the portion where the purge pipe 31 is connected to the vapor pipe 32 and the canister 33. The bypass valve 37 includes an electromagnetic solenoid and is driven by the electromagnetic solenoid. The bypass valve 37 is a normally-open-type electromagnetic valve that is open when the electromagnetic solenoid is not energized (OFF) and is closed when a drive signal is externally supplied to the electromagnetic solenoid so that the electromagnetic solenoid is energized (ON). The bypass valve 37, when the electromagnetic solenoid is not energized (OFF) so that the bypass valve 37 is open, opens the canister 33 to the purge pipe 31, whereas the bypass valve 37, when the drive signal is externally supplied to the electromagnetic solenoid to energize the electromagnetic solenoid (ON) so that the purge valve 36 is therefore closed, blocks the canister 33. That is, the bypass valve 37, when it is closed, seals the canister 33 and therefore does not allow the fuel evaporative gas to flow into the canister 33 or the fuel evaporative gas to flow out from the canister 33. The bypass valve 37, when it is open, allows the fuel evaporative gas to flow into the canister 33 or the fuel evaporative gas to flow out from the canister 33.

The pressure sensor 38 is disposed in the vapor pipe 32 between the fuel tank 21 and the sealing valve 35. The pressure sensor 38 detects tank pressure Pt, which is internal pressure in the fuel tank 21. The pressure sensor 38 can detect the internal pressure only in the fuel tank 21 only when the sealing valve 35 is closed so that the fuel tank 21 is sealed.

The control unit 40 is a control device for performing overall control of the vehicle and is formed of an input/output device, a storage device (such as ROM, RAM, and nonvolatile RAM), a central processing unit (CPU), a timer, and other components.

The sucked air temperature sensor 14, the water temperature sensor 15, the pressure sensor 34h, and the pressure sensor 38 described above are connected to the input side of the control unit 40, and detection information from each of the sensors is inputted to the control unit 40.

On the other hand, the fuel injecting valve 12, the fuel pump 23, the negative pressure pump 34c, the switching valve 34e, the sealing valve 35, the purge valve 36, and the bypass valve 37 described above are connected to the output-side of the control unit 40.

The control unit 40 controls the operation of the negative pressure pump 34c and opening/closing of the switching valve 34e, the sealing valve 35, the purge valve 36, and the bypass valve 37 on the basis of the detection information from each of the variety of sensors to allow the fuel evaporative gas produced in the fuel tank 21 to be adsorbed by the canister 33 and control a purge process of discharging the fuel evaporative gas adsorbed by the canister 33 and the fuel evaporative gas produced in the fuel tank 21 when the engine 10 is in operation into the intake passage 11 of the engine 10.

The control unit 40 further performs pump monitoring in which abnormality of the negative pressure pump 34c is detected and leakage monitoring in which leakage in the fuel evaporative gas processor 30 is detected when the engine 10 is started. The control performed by the control unit 40 in the pump monitoring corresponds to the first evaluation controller according to the present invention, and the control performed by the control unit 40 in the leakage monitoring corresponds to the second evaluation controller according to the present invention.

Figure 4:
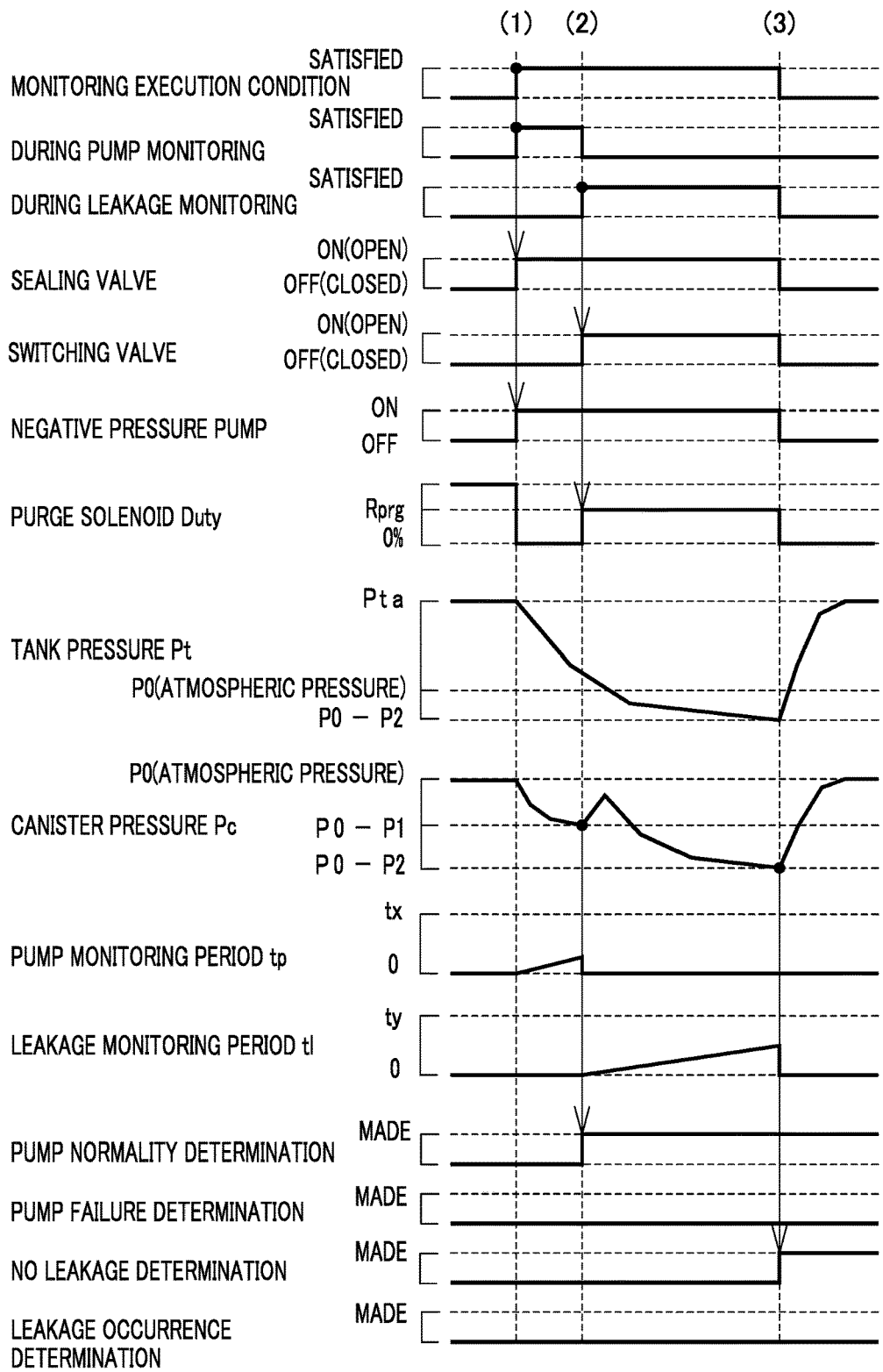
FIG. 4 is a time chart showing an example of transitions of the action of each valve, a negative pressure pump, and each timer and changes in canister pressure in a case where it is determined that there is no abnormality of the negative pressure pump and no leakage has occurred.
Figure 5:
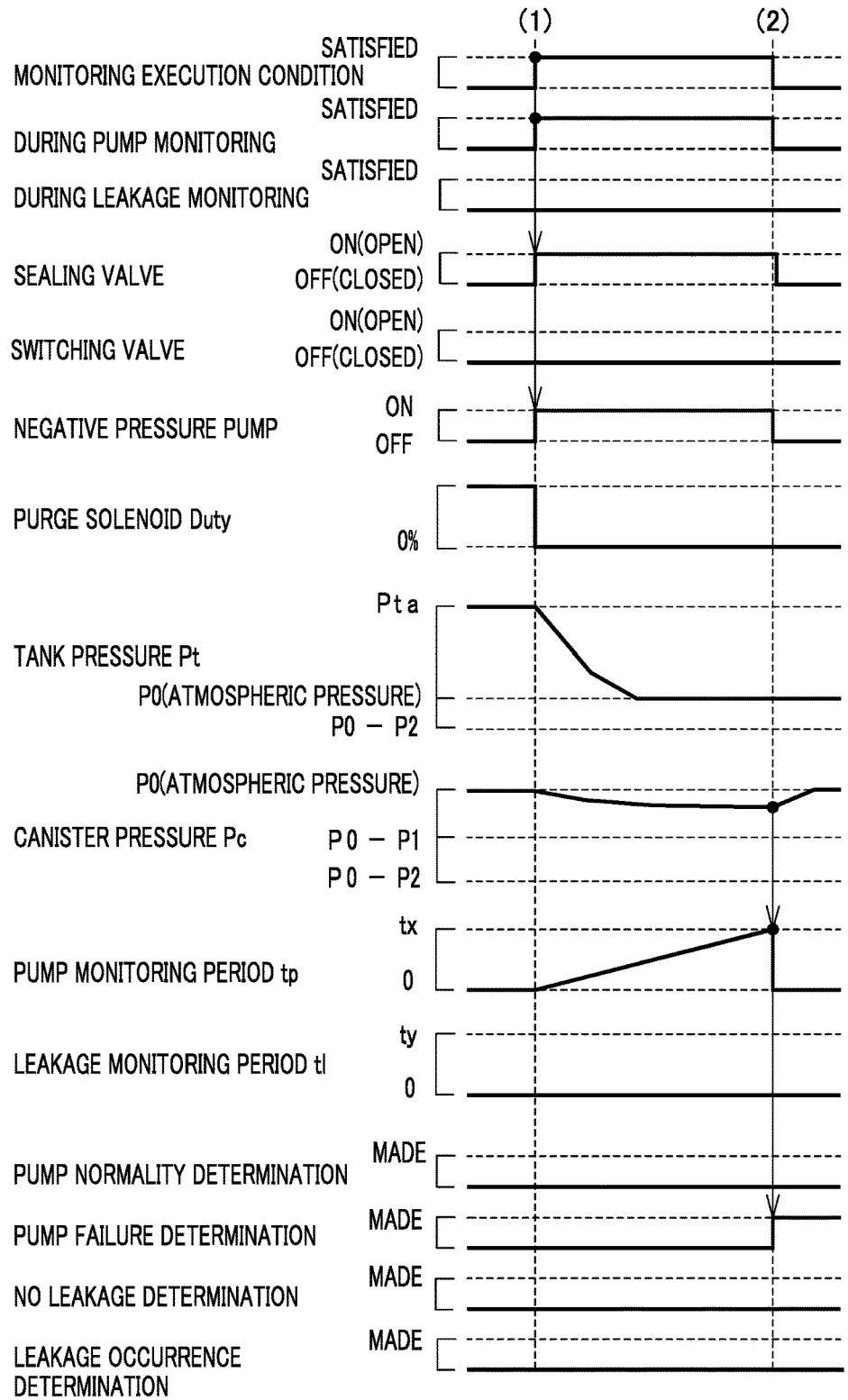
FIG. 5 is a time chart showing an example of transitions of the action of each valve, the negative pressure pump, and each timer and changes in the canister pressure in a case where it is determined that there is abnormality of the negative pressure pump.
Figure 6:
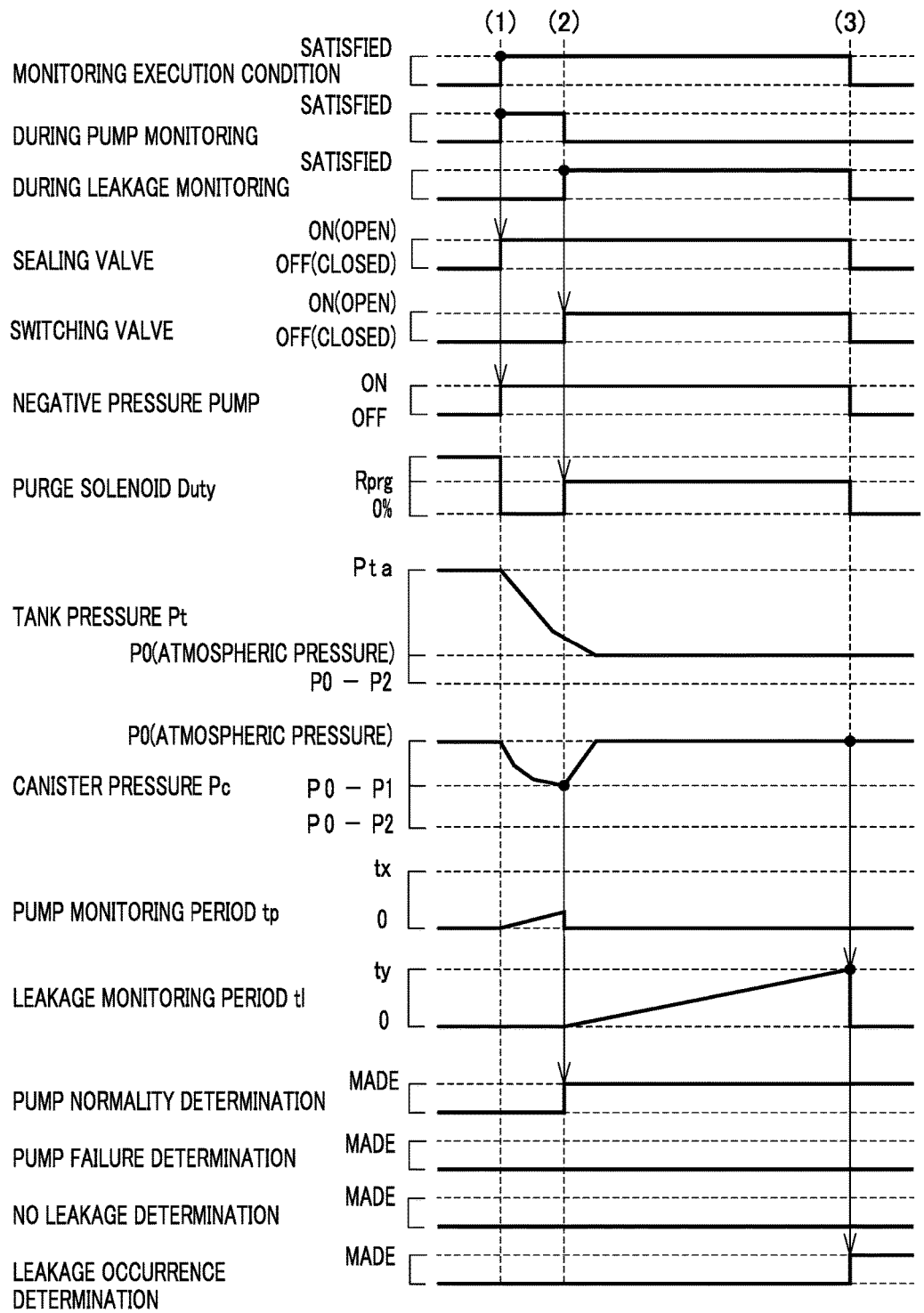
FIG. 6 is a time chart showing an example of transitions of the action of each valve, the negative pressure pump, and each timer and changes in the canister pressure in a case where it is determined that there is no abnormality of the negative pressure pump but leakage has occurred.

FIG. 4 is a time chart showing an example of transitions of the action of each of the valves (sealing valve 35, switching valve 34e, and purge valve 36) and the negative pressure pump 34c and changes in monitoring periods tp and tl and the canister pressure Pc in a case where it is determined that the negative pressure pump 34c is normally operating and no leakage has occurred. FIG. 5 is a time chart showing an example of transitions of the action of the valves 35, 34e, and 36 and the negative pressure pump 34c and changes in the monitoring periods tp and tl and the canister pressure Pc in a case where it is determined that the negative pressure pump 34c is abnormally operating. FIG. 6 is a time chart showing an example of transitions of the action of the valves 35, 34e, and 36 and the negative pressure pump 34c and changes in the monitoring periods tp and tl and the canister pressure in a case where it is determined that the negative pressure pump 34c is normally operating but leakage has occurred.

How the control unit 40 controls the pump monitoring and the leakage monitoring in accordance with the thus configured present invention will be described below.

The control unit 40 performs the pump monitoring and the leakage monitoring when the control unit 40 receives a diagnosis request from a diagnosis tool, for example, after several seconds elapsed since the engine was started. When the engine is started, the states of the valves and the negative pressure pump are as follows, as shown in FIGS. 4 to 6: The sealing valve 35 is closed; the switching valve 34e is open; the negative pressure pump 34c is not in operation; the purge valve 36 is closed; and the bypass valve 37 is open. The bypass valve 37 is kept open during the period for which the pump monitoring and the leakage monitoring are performed. Further, since the fuel tank 21 in the present embodiment is a sealed tank, the fuel evaporative gas produced in the fuel tank 21 causes the internal pressure in the fuel tank 21 to be typically higher than atmospheric pressure P0 when the engine is started. For example, the fuel tank 21 has tank initial pressure Pta.

The control unit 40 first starts the pump monitoring after the diagnosis request is received and when a monitoring execution condition is satisfied. When the pump monitoring starts, the sealing valve 35 is opened, and the negative pressure pump 34c is activated ((1) in FIGS. 4 to 6). As a result, the pressure in the fuel tank 21 is released to the atmosphere via the vapor pipe 32 and the canister 33. The canister pressure Pc then gradually lowers as the negative pressure pump 34c operates.

The control unit 40 starts measuring the pump monitoring period tp when the negative pressure pump 34c starts operating ((1) in FIGS. 4 to 6), and in a case where the canister pressure Pc detected with the pressure sensor 34h has lowered from the atmospheric pressure P0 at least by first predetermined pressure P1 (first predetermined value) before a first predetermined period tx elapses, the control unit 40 makes pump normality determination representing that the negative pressure pump 34c is normally operating ((2) in FIGS. 4 to 6). The first predetermined pressure P1 may set, for example, at 1 kPa. In a case where the canister pressure Pc has not lowered from the atmospheric pressure P0 at least by the first predetermined pressure P1 before the first predetermined period tx elapses, the control unit 40 makes pump failure determination representing that the negative pressure pump 34c is abnormally operating and terminates the pump monitoring ((2) in FIG. 5). In the case where the pump failure determination is made, no leakage monitoring is performed.

In the case where the control unit 40 determines that the negative pressure pump 34c is normally operating, the switching valve 34e is closed, and a purge solenoid duty (duty ratio of solenoid in purge valve 36) is increased from 0% (fully closed) to a predetermined duty ratio Rprg. At this point, the negative pressure pump 34c is continuously operated, and the sealing valve 35 is kept open ((2) in FIGS. 4 and 6).

The control unit 40 starts measuring the leakage monitoring period tl after the control unit 40 starts closing the switching valve 34e and opening the purge valve 36, and when the canister pressure Pc detected with the pressure sensor 34h has lowered from the atmospheric pressure P0 at least by second predetermined pressure P2 (second predetermined value) before a second predetermined period ty elapses, the control unit 40 makes no leakage determination representing that no leakage occurs in the fuel evaporative gas emission suppressor 1 ((3) in FIG. 4). The second predetermined pressure P2 may set, for example, at 2 kPa. In a case where the canister pressure Pc has not lowered from the atmospheric pressure P0 at least by the second predetermined pressure P2 before the second predetermined period ty elapses, the control unit 40 determines that leakage has occurred in the fuel evaporative gas emission suppressor 1 and makes leakage occurrence determination representing purge failure, and the control unit 40 terminates the leakage monitoring ((3) in FIG. 6).

As described above, the fuel evaporative gas emission suppressor 1 according to the present invention performs the pump monitoring after the engine is started and subsequently performs the leakage monitoring in the case where the pump normal determination has been made.

In the pump monitoring, in which the sealing valve 35 is open and the bypass valve 37 and the switching valve 34e are open, the canister 33 and the fuel tank 21 are opened to the atmosphere. Therefore, even in the case where the fuel tank 21 has high internal pressure before the engine is started, the tank pressure Pt has been lowered to the atmospheric pressure P0 at the end of the pump monitoring. As a result, in the leakage monitoring performed subsequently to the pump monitoring, accurate leakage monitoring can be performed with no effect of the pressure in the fuel tank 21.

As described above, in the present embodiment, when the pump monitoring is performed, the switching valve 34e can be opened at the same time, and the leakage monitoring can be further subsequently performed without waiting for the state in which the canister 33 and the fuel tank 21 are opened to the atmosphere, whereby the pump monitoring and the leakage monitoring can be quickly completed after the engine is started.

In the present embodiment, since the pump passage 34d and the canister 33, which form a space where the pressure sensor 34h performs pressure detection, communicate with each other via the reference orifice 34g irrespective of the state of the switching valve 34e, open or closed, and the bypass valve 37 and the sealing valve 35 are open in the pump monitoring, the pressure in the fuel tank 21 at the start of the pump monitoring affects a value detected with the pressure sensor 34h (canister pressure Pc) in the pump monitoring. For example, in a case where the pressure in the fuel tank 21 is positive when the pump monitoring starts, it undesirably takes time to lower the canister pressure Pc after the negative pressure pump 34c is activated. Further, in a case where the pressure in the fuel tank 21 is significantly high and the canister pressure Pc does not lower enough to reach the atmospheric pressure P0 in the pump monitoring, in which the switching valve 34e is opened so that the fuel tank 21 is opened to the atmosphere, and when the leakage monitoring is initiated after the pump monitoring is completed, it undesirably takes time in the leakage monitoring before the canister pressure Pc lowers to the second predetermined pressure P2 even in a case where no actual leakage has occurred.

On the other hand, in a case where the pressure in the fuel tank 21 is negative when the pump monitoring starts, the space where the pressure sensor 34h performs detection has negative pressure when the sealing valve 35 is opened, and the state of the negative pressure pump 34c is likely to be wrongly evaluated, that is, it is likely to be determined that the negative pressure pump 34c is normally operating even when the negative pressure pump 34c is actually abnormally operating.

To avoid the situation described above, in the fuel evaporative gas emission suppressor 1 according to the embodiment described above, the pump monitoring and the leakage monitoring may be differently controlled on the basis of the tank pressure Pt after the engine is started and when the monitoring execution condition is satisfied.

The control unit 40 not only controls the pump monitoring and leakage monitoring described above but performs first change control in which the first predetermined period tx, which is the abnormality evaluation period in the pump monitoring, is changed in a case where the tank pressure Pt detected with the pressure sensor 38 when the monitoring execution condition is satisfied ((1) in FIGS. 4 to 6) is a predetermined positive value or greater. The first change control may be performed so that the first predetermined period tx is prolonged as the tank pressure Pt is high. As a result, even in the case where the pressure in the fuel tank 21 is significantly high when the pump monitoring starts, the pressure in the pump passage 34d, which is the space where the pressure sensor 38 performs detection, can be sufficiently lowered as long as the negative pressure pump 34c is normally operating, whereby the reliability of the pump monitoring can be improved. In the case where the tank pressure Pt is positive, setting the first predetermined period tx at a shorter period for a lower tank pressure Pt allows the period for which the pump monitoring is performed to be shortened with the effect of the pressure in the fuel tank 21 in the pump monitoring eliminated.

Further, in the case where the tank pressure Pt detected when the monitoring execution condition is satisfied is the predetermined positive value or greater, the control unit 40 performs second change control in which the second predetermined period ty, which is the abnormality evaluation period in the leakage monitoring, is changed. The second change control may be performed so that the second predetermined period ty is prolonged as the tank pressure Pt detected when the monitoring execution condition is satisfied is higher than the atmospheric pressure P0. Instead, in a case where the tank pressure Pt is detected when the leakage monitoring starts ((2) in FIGS. 4 and 6) and the tank pressure Pt is positive, the second predetermined period ty may be prolonged as the tank pressure Pt is high. As a result, for example, even in the case where the tank pressure Pt is still positive when the pump monitoring is completed, the pressure in the pump passage 34d can be sufficiently lowered in the leakage monitoring as long as no leakage has occurred, whereby the reliability of the leakage monitoring can be improved. In the case where the tank pressure Pt is positive, setting the second predetermined period ty at a shorter period for a lower tank pressure Pt allows the period for which the leakage monitoring is performed to be shortened with the effect of the pressure in the fuel tank 21 in the leakage monitoring eliminated.

The first predetermined period tx in the first change control and the second predetermined period ty in the second change control may be continuously changed or may be changed in a stepwise manner in accordance with the tank pressure Pt.

On the other hand, in a case where the tank pressure Pt detected when the monitoring execution condition is satisfied is negative, third change control may be performed as follows: That is, after the sealing valve 35 is opened to achieve a state in which the tank pressure Pt is a predetermined value or greater, the negative pressure pump 34c is operated, and counting of the pump monitoring period tp is initiated, followed by the pump monitoring. The predetermined value of the tank pressure Pt at the start of the pump monitoring may be set so that the tank pressure Pt reliably reaches the atmospheric pressure P0 at the end of the pump monitoring. As a result, the pump monitoring can be performed with the effect of the pressure in the fuel tank 21 in the pump monitoring eliminated, whereby the reliability of the pump monitoring can be improved.

An embodiment of the present invention has been described, but the form of the present invention is not limited to the embodiment described above.

For example, the first change control to the third change control are preferably all performed, but any one or a plurality of the first change control to the third change control may instead be performed.

In the embodiment described above, the pressure sensor 38 detects the pressure in the fuel tank 21. Instead, a pressure sensor provided in the fuel tank 21 may directly detect the pressure in the fuel tank 21.

In the embodiment described above, the vehicle is assumed to be a hybrid vehicle, but the vehicle is not necessarily a hybrid vehicle. The fuel evaporative gas emission suppressor including a negative pressure pump capable of providing negative pressure in the canister 33 and a pressure sensor that detects the pressure in the canister 33 can be used with a wide variety of vehicles, and the negative pressure pump and whether or not leakage has occurred can be quickly evaluated.

What is claimed is:

1. A fuel evaporative gas emission suppressor comprising:
   a communication path that allows an intake passage of an internal combustion engine to communicate with a fuel tank;
   a sealing valve that opens and closes the communication between the fuel tank and the communication path;
   a canister that is connected to the communication path between the intake passage and the sealing valve so as to branch out from the communication path and adsorbs fuel evaporative gas in the fuel tank;
   a negative pressure generator that is connected to the canister via a connection path and generates negative pressure in the canister and the fuel tank;
   a switching valve that performs switching operation of connecting the canister to the negative pressure generator or an atmosphere-side passage that communicates with atmosphere;
   a bypass passage that causes the negative pressure generator to communicate with the canister via an orifice;
   a first pressure detector that detects pressure in the connection path; and a control unit that is formed of a storage device and a processing unit; wherein
the control unit comprises:
a first evaluation controller that activates the negative pressure generator and evaluates abnormality thereof based on the pressure detected by the first pressure detector with the sealing valve open in a state in which the switching valve is controlled so as to connect the canister to the atmosphere-side passage; and
a second evaluation controller that operates subsequently to end of the evaluation of abnormality of the negative pressure generator performed by the first evaluation controller, controls the switching valve in such a way that the negative pressure generator is connected to the canister via the connection path so that gas in the canister and the fuel tank is purged into the intake passage of the internal combustion engine via the communication path, and evaluates whether or not leakage has occurred in the communication path, the canister, and the fuel tank based on the pressure detected by the first pressure detector.

2. The fuel evaporative gas emission suppressor according to claim 1,
wherein the first evaluation controller determines that the negative pressure generator is normally operating in a case where the pressure detected by the first pressure detector has lowered at least by a first predetermined value after the activation of the negative pressure generator but before a first predetermined period elapses and determines that the negative pressure generator is abnormally operating in a case where the pressure detected by the first pressure detector has not lowered at least by the first predetermined value after the activation of the negative pressure generator but before the first predetermined period elapses.

3. The fuel evaporative gas emission suppressor according to claim 2,
further comprising a second pressure detector that detects pressure in the fuel tank,
wherein in a case where the pressure in the fuel tank is positive at the start of operation of the negative pressure generator, the first evaluation controller prolongs the first predetermined period as the pressure in the fuel tank is high.

4. The fuel evaporative gas emission suppressor according to claim 3,
wherein in a case where the pressure in the fuel tank is negative at the start of operation of the negative pressure generator, the first evaluation controller controls the switching valve in such a way that the canister is connected to the atmosphere-side passage to cause the pressure in the fuel tank to reach atmospheric pressure, then activates the negative pressure generator, and evaluates abnormality of the negative pressure generator based on the pressure detected by the first pressure detector.

5. The fuel evaporative gas emission suppressor according to claim 4,
wherein in a case where the second evaluation controller controls the switching valve in such a way that the negative pressure generator communicates with the canister via the connection path so that the purge is initiated and the pressure detected by the first pressure detector has lowered at least by a second predetermined value after the start of the purge but before a second predetermined period elapses, the second evaluation controller determines that no leakage has occurred, whereas in a case where the pressure detected by the first pressure detector has not lowered at least by the second predetermined value after the start of the purge but before the second predetermined period elapses, the second evaluation controller determines that the leakage has occurred.

6. The fuel evaporative gas emission suppressor according to claim 5,
wherein in a case where the pressure in the fuel tank is positive at the start of operation of the negative pressure generator, the second evaluation controller prolongs the second predetermined period as the pressure in the fuel tank is high.

7. The fuel evaporative gas emission suppressor according to claim 3,
wherein in a case where the second evaluation controller controls the switching valve in such a way that the negative pressure generator communicates with the canister via the connection path so that the purge is initiated and the pressure detected by the first pressure detector has lowered at least by a second predetermined value after the start of the purge but before a second predetermined period elapses, the second evaluation controller determines that no leakage has occurred, whereas in a case where the pressure detected by the first pressure detector has not lowered at least by the second predetermined value after the start of the purge but before the second predetermined period elapses, the second evaluation controller determines that the leakage has occurred.

8. The fuel evaporative gas emission suppressor according to claim 7,
wherein in a case where the pressure in the fuel tank is positive at the start of operation of the negative pressure generator, the second evaluation controller prolongs the second predetermined period as the pressure in the fuel tank is high.

9. The fuel evaporative gas emission suppressor according to claim 2,
further comprising a second pressure detector that detects pressure in the fuel tank,
wherein in a case where the pressure in the fuel tank is negative at the start of operation of the negative pressure generator, the first evaluation controller controls the switching valve in such a way that the canister is connected to the atmosphere-side passage to cause the pressure in the fuel tank to reach atmospheric pressure, then activates the negative pressure generator, and evaluates abnormality of the negative pressure generator based on the pressure detected by the first pressure detector.

10. The fuel evaporative gas emission suppressor according to claim 9,
wherein in a case where the second evaluation controller controls the switching valve in such a way that the negative pressure generator communicates with the canister via the connection path so that the purge is initiated and the pressure detected by the first pressure detector has lowered at least by a second predetermined value after the start of the purge but before a second predetermined period elapses, the second evaluation controller determines that no leakage has occurred, whereas in a case where the pressure detected by the first pressure detector has not lowered at least by the second predetermined value after the start of the purge but before the second predetermined period elapses, the second evaluation controller determines that the leakage has occurred.

11. The fuel evaporative gas emission suppressor according to claim 10,
further comprising a second pressure detector that detects pressure in the fuel tank,
wherein in a case where the pressure in the fuel tank is positive at the start of operation of the negative pressure generator, the second evaluation controller prolongs the second predetermined period as the pressure in the fuel tank is high.

12. The fuel evaporative gas emission suppressor according to claim 2,
wherein in a case where the second evaluation controller controls the switching valve in such a way that the negative pressure generator communicates with the canister via the connection path so that the purge is initiated and the pressure detected by the first pressure detector has lowered at least by a second predetermined value after the start of the purge but before a second predetermined period elapses, the second evaluation controller determines that no leakage has occurred, whereas in a case where the pressure detected by the first pressure detector has not lowered at least by the second predetermined value after the start of the purge but before the second predetermined period elapses, the second evaluation controller determines that the leakage has occurred.

13. The fuel evaporative gas emission suppressor according to claim 12,
further comprising a second pressure detector that detects pressure in the fuel tank,
wherein in a case where the pressure in the fuel tank is positive at the start of operation of the negative pressure generator, the second evaluation controller prolongs the second predetermined period as the pressure in the fuel tank is high.

14. The fuel evaporative gas emission suppressor according to claim 1,
wherein in a case where the second evaluation controller controls the switching valve in such a way that the negative pressure generator communicates with the canister via the connection path so that the purge is initiated and the pressure detected by the first pressure detector has lowered at least by a second predetermined value after the start of the purge but before a second predetermined period elapses, the second evaluation controller determines that no leakage has occurred, whereas in a case where the pressure detected by the first pressure detector has not lowered at least by the second predetermined value after the start of the purge but before the second predetermined period elapses, the second evaluation controller determines that the leakage has occurred.

15. The fuel evaporative gas emission suppressor according to claim 14,
further comprising a second pressure detector that detects pressure in the fuel tank,
wherein in a case where the pressure in the fuel tank is positive at the start of operation of the negative pressure generator, the second evaluation controller prolongs the second predetermined period as the pressure in the fuel tank is high.

\* \* \* \* \*